(12) United States Patent
Koike

(10) Patent No.: US 7,295,714 B2
(45) Date of Patent: Nov. 13, 2007

(54) IMAGE PROCESSING CIRCUIT AND IMAGE PROCESSING METHOD THAT PREVENT PROBLEMS OCCURRING IN IMAGE REDUCTION

(75) Inventor: Kazumasa Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 774 days.

(21) Appl. No.: 10/465,832

(22) Filed: Jun. 16, 2003

(65) Prior Publication Data

US 2004/0001640 A1  Jan. 1, 2004

(30) Foreign Application Priority Data

Jun. 26, 2002 (JP) ............... 2002-186061

(51) Int. Cl.
    *G06K 9/40* (2006.01)
(52) U.S. Cl. ............ 382/254; 382/169; 382/170; 382/259; 358/1.2; 358/3.01; 358/3.26
(58) Field of Classification Search ........ 382/255, 382/258, 274, 275, 167, 169, 256, 321, 259; 358/1.2, 3.26, 3.27, 3.01, 3.02, 518
See application file for complete search history.

(56) References Cited

U.S. PATENT DOCUMENTS

| | | | |
|---|---|---|---|
| 5,231,519 A | 7/1993 | Koike | |
| 5,243,445 A | 9/1993 | Koike | |
| 5,386,301 A | 1/1995 | Yuasa et al. | |
| 5,408,338 A | 4/1995 | Koike | |
| 5,452,107 A | 9/1995 | Koike | |
| 5,550,647 A | 8/1996 | Koike | |
| 5,572,603 A | 11/1996 | Koike | |
| 5,608,538 A * | 3/1997 | Edgar et al. | 358/406 |
| 5,680,225 A | 10/1997 | Hirabayashi et al. | |
| 5,706,096 A | 1/1998 | Koike | |
| 5,771,317 A * | 6/1998 | Edgar | 382/260 |
| 5,815,605 A | 9/1998 | Koike | |
| 5,871,019 A * | 2/1999 | Belohlavek | 600/450 |
| 6,081,625 A * | 6/2000 | Sakaue | 382/254 |
| 6,219,099 B1 * | 4/2001 | Johnson et al. | 348/383 |
| 6,278,513 B1 * | 8/2001 | Murata et al. | 355/44 |
| 6,326,628 B1 * | 12/2001 | Kimura et al. | 250/458.1 |
| 6,400,468 B1 * | 6/2002 | Rao et al. | 358/1.9 |
| 6,546,149 B1 * | 4/2003 | Ruggiero et al. | 382/275 |
| 6,600,839 B2 * | 7/2003 | Mancuso et al. | 382/268 |
| 6,964,023 B2 * | 11/2005 | Maes et al. | 715/811 |

FOREIGN PATENT DOCUMENTS

JP 8289137 11/1996

OTHER PUBLICATIONS

Jan. 30, 2007 official action in connection with Japanese Patent Application No. 2002-186061.

* cited by examiner

*Primary Examiner*—Yosef Kassa
(74) *Attorney, Agent, or Firm*—Cooper & Dunham, LLP

(57) ABSTRACT

An image processing circuit reduces binary data of an original image. At least one line buffer stores data of each line of the original image. At least one line buffer stores data of each line of a reduced image. An operation part performs a logical operation based on data of focused pixels of the original image, data of a peripheral pixel of the focused pixels, and data of peripheral pixels of a pixel of the reduced image, the pixel of the reduced image corresponding to the focused pixels.

15 Claims, 9 Drawing Sheets

100

IMAGE PROCESSING CIRCUIT AND IMAGE PROCESSING METHOD THAT PREVENT PROBLEMS OCCURRING IN IMAGE REDUCTION

BACKGROUND OF THE INVENTION

1. Field of the Invention

The present invention relates to image processing circuits and image processing methods for image reduction of black-and-white images in such as facsimile apparatuses, digital copying machines, image scanners, and printers that can prevent loss of thin lines and generation of solid black images and also prevent image quality degradation in inverted (rotated 180°) T-shaped images and line thickening in laid (rotated 90°) T-shaped images, which cannot be solved by conventional operations.

2. Description of the Related Art

As for image processing techniques for reducing black-and-white images, generally, the following processes are carried out as the simplest processes: a simple thinning process of selecting one arbitrary line from among focused N lines and rendering the selected line as an output image, and an OR process of rendering a logical sum (OR) of all the N lines as an output image.

In the simple thinning process, however, when a line to be thinned out includes a black pixel and a line including only white pixels is left, for example, a thin line in the main scanning direction is missed. On the other hand, in the OR process, it is possible to prevent a thin line in the main scanning direction from being missed. However, at the same time, if there is one black pixel in N lines, it is determined that the output image at the column position is formed by black pixels. As a result, there is a disadvantage in that the output image is more likely to be a solid black image.

Therefore, as described in Japanese Laid-Open Patent Application No. 8-289137, an image reducing method of using the simple thinning process and the OR process together and selectively carrying out one of the processes in accordance with the quality of an image is known. In addition, a reducing method of selectively carrying out a thinning process according to the number of black pixels is also known.

In a pixel density conversion apparatus using the above-described methods, for example, the OR process is performed on image data of character documents so as to prevent thin lines from being missed, the simple thinning process is performed on image data of photographic documents so as to prevent degradation in reproducibility of halftones, and, in the thinning process according to the number of black pixels, the number of black pixels of each line is counted and lines other than the line having the largest number of black pixels are thinned out so as to prevent thin lines from being missed.

However, such processes do not solve the problem that an output image becomes a solid black image when the OR process is selected. Thus, fundamental solutions for the above-described problems are not provided.

Additionally, the thinning according to the number of black pixels provides an output image of the middle-level between the simple thinning process and the OR process. Thus, the thinning according to the number of black pixels only slightly reduces loss of thin lines and production of solid black images, and does not provide the ultimate solutions.

By the way, methods for compensating for the shortcomings of the OR process include methods of referring to data of a peripheral pixel that is adjacent in the sub-scanning direction to a focused pixel of a reduced image (image after reduction), when performing a reducing process in the sub-scanning direction, as shown in the following Equations 1 and 2.

$$o(x, y) = inv[o(x, y-1)] \cdot i(x, 2y-1) + i(x, 2y) \qquad \text{Equation 1}$$

or $$o(x, y) = inv[o(x, y-1)] \cdot i(x, 2y) + i(x, 2y+1) \qquad \text{Equation 2}$$

i: pixel data of original image (black=1, white=0)
o: pixel data of reduced image (black=1, white=0)
x: pixel value in main scanning direction
y: pixel value in sub-scanning direction Hereinafter, the reducing process of Equation 1 is referred to as a "process using conventional technique A", and the reducing process of Equation 2 is referred to as a "process using conventional technique B".

FIGS. 1B, 1C, and 1D show the results of performing, on a horizontal-striped input image shown in FIG. 1A, a 50% reducing process by an OR operation, the process using conventional technique A (50% reducing process), and the process using conventional technique B (50% reducing process), respectively. As can be seen from FIG. 1B, a solid black image is produced in the reduction by the OR operation. In addition, as shown in FIGS. 1C and 1D, in the processes using conventional techniques A and B, a solid black image is partially produced.

In addition, FIGS. 2B, 2C, and 2D show the results of performing, on an inverted T-shaped input image shown in FIG. 2A, the 50% reducing process by an OR operation, the process using conventional technique A (50% reducing process), and the process using conventional technique B (50% reducing process), respectively. As can be seen from FIGS. 2B and 2C, there is no defect (good results are obtained) in the reduction by the OR operation and the process using conventional technique A. On the other hand, as shown in FIG. 2D, in the process using conventional technique B, a blank part (missing part)(denoted by the reference numeral 100 in FIG. 2D) is partially produced.

Further, FIGS. 3B, 3C, and 3D show the results of performing, on a laid T-shaped input image shown in FIG. 3A, the 50% reducing process by an OR operation, the process using conventional technique A (50% reducing process), and the process using conventional technique B (50% reducing process), respectively. As can be seen from FIGS. 3B and 3C, in the reduction by the OR operation (FIG. 3B) and the process using conventional technique A (FIG. 3C), line thickening occurs. As shown in FIG. 3E, in the process using conventional technique B, there is no defect (a good result is obtained).

SUMMARY OF THE INVENTION

It is a general object of the present invention to provide an improved and useful image processing circuit and image processing method in which the above-mentioned problems are eliminated.

It is another and more specific object of the present invention to prevent loss of thin lines and generation of solid black images and to prevent image quality degradation in inverted T-shaped images and line thickening in laid T-shaped images, which problems cannot be solved by conventional operations.

In order to achieve the above-mentioned objects, according to one aspect of the present invention, there is provided an image processing circuit reducing binary data of an original image, including:

at least one line buffer storing data of each line of the original image;

at least one line buffer storing data of each line of a reduced image; and an operation part performing a logical operation based on data of focused pixels of the original image, data of a peripheral pixel of the focused pixels, and data of peripheral pixels of a pixel of the reduced image, the pixel of the reduced image corresponding to the focused pixels of the original image.

Also, in the image processing circuit according to the present invention, when performing a reducing operation in a main scanning direction, the operation part may perform the logical operation by using data of a peripheral pixel that is adjacent in a sub-scanning direction to the focused pixels of the original image.

In addition, when performing a reducing operation in the sub-scanning direction, the operation part may perform the logical operation by using data of a peripheral pixel that is adjacent in the main scanning direction to the focused pixels of the original image.

Further, when performing a reducing operation in the main scanning direction, the operation part may perform the logical operation by using data of a peripheral pixel that is adjacent in a sub-scanning direction to a pixel of the reduced image, the pixel of the reduced image corresponding to the focused pixels.

Additionally, when performing a reducing operation in the sub-scanning direction, the operation part may perform the logical operation by using data of a peripheral pixel that is adjacent in the main scanning direction to a pixel of the reduced image, the pixel of the reduced image corresponding to the focused pixels.

More specifically, the operation part may perform a logical operation expressed by:

$$o(x, y) = inv[o(x, y-1)] \cdot i(x, 2y) + o(x-1, y) \cdot inv[i(x-1, 2y+1)] \cdot i(x, 2y) + i(x, 2y+1)$$

where "i" is pixel data of the original image (black=1, white=0), "o" is pixel data of the reduced image (black=1, white=0), "x" is a pixel value in the main scanning direction, and "y" is a pixel value in the sub-scanning direction.

Additionally, the operation part may perform a logical operation expressed by:

$$o(x, y) = inv[o(x-1, y)] \cdot i(2x, y) + o(x, y-1) \cdot inv[i(2x+1, y-1)] \cdot i(2x, y) + i(2x+1, y)$$

where "i" is pixel data of the original image (black=1, white=0), "o" is pixel data of the reduced image (black=1, white=0), "x" is a pixel value in the main scanning direction, and "y" is a pixel value in the sub-scanning direction.

Further, according to another aspect of the present invention, there is also provided an image processing method of reducing binary data of an original image, including the steps of:

storing data of each line of the original image;

storing data of each line of a reduced image; and performing a logical operation based on data of focused pixels of the original image, data of a peripheral pixel of the focused pixels, and data of peripheral pixels of a pixel of the reduced image, the pixel of the reduced image corresponding to the focused pixels.

According to the present invention, when reducing an image, it is possible to prevent loss of thin lines and generation of solid black images and to prevent image quality degradation in inverted T-shaped images and line thickening in laid T-shaped images, which problems cannot be solved by conventional operations.

Other objects, features and advantages of the present invention will become more apparent from the following detailed description when read in conjunction with the following drawings.

DETAILED DESCRIPTION OF THE PREFERRED EMBODIMENTS

Figure 4:
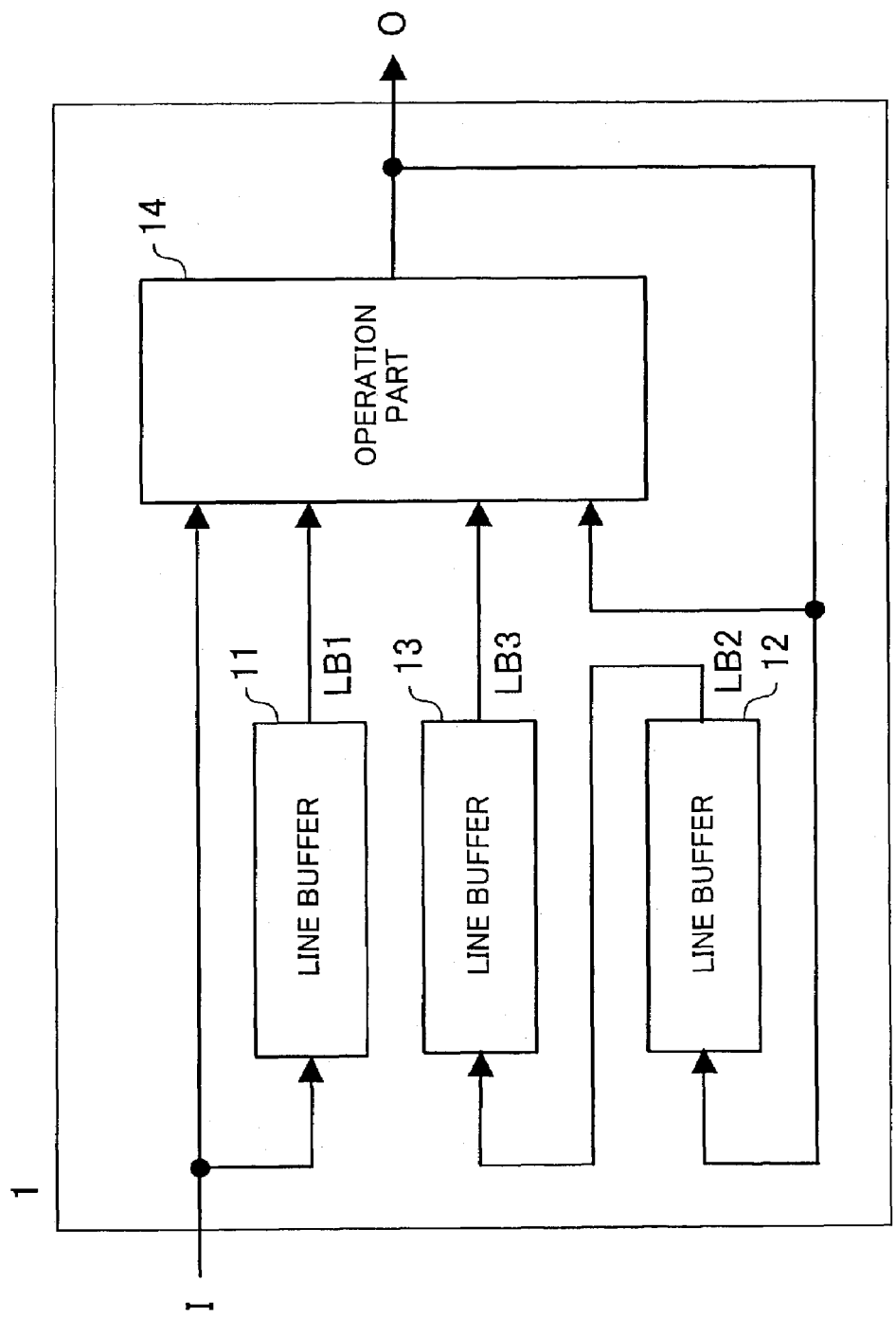
FIG. 4 is a block diagram showing an image processing circuit used in one embodiment of the present invention.

FIG. 4 is a block diagram showing an image processing circuit used in one embodiment of the present invention. An image processing circuit 1 may be used for reduction in the sub-scanning direction and reduction in the main scanning direction, as is described below.

The image processing circuit 1 can reduces binary data of an original image by 50% in the sub-scanning direction or the main scanning direction. As shown in FIG. 4, the image processing circuit 1 includes a line buffer 11 as first line buffer means storing line data (data of each line) of the original image, and two line buffers 12 and 13 as second line buffer means sequentially storing pixel data that form lines of a reduced image (image after reduction) calculated by an operation part 14 as operation means.

Input data I are input to the operation part 14 and also to the line buffer 11. The output of the line buffer 11 is input to the operation part 14. The output data O of the operation part 14 is input to the operation part 14 itself and also to the line buffer 12. Additionally, the output of the line buffer 12 is input to the line buffer 13, and the output of the line buffer 13 is input to the operation part 14.

Accordingly, the operation part 14 performs a logical operation of pixels of the reduced image O (a focused pixel of the reduced image) based on data of two kinds of focused pixels of the original image of the input data I (focused pixels of the original image corresponding to the focused pixel of the reduced image), data of the peripheral pixel, and data of reference pixels in the periphery of the focused pixel of the reduced image.

Figure 5:
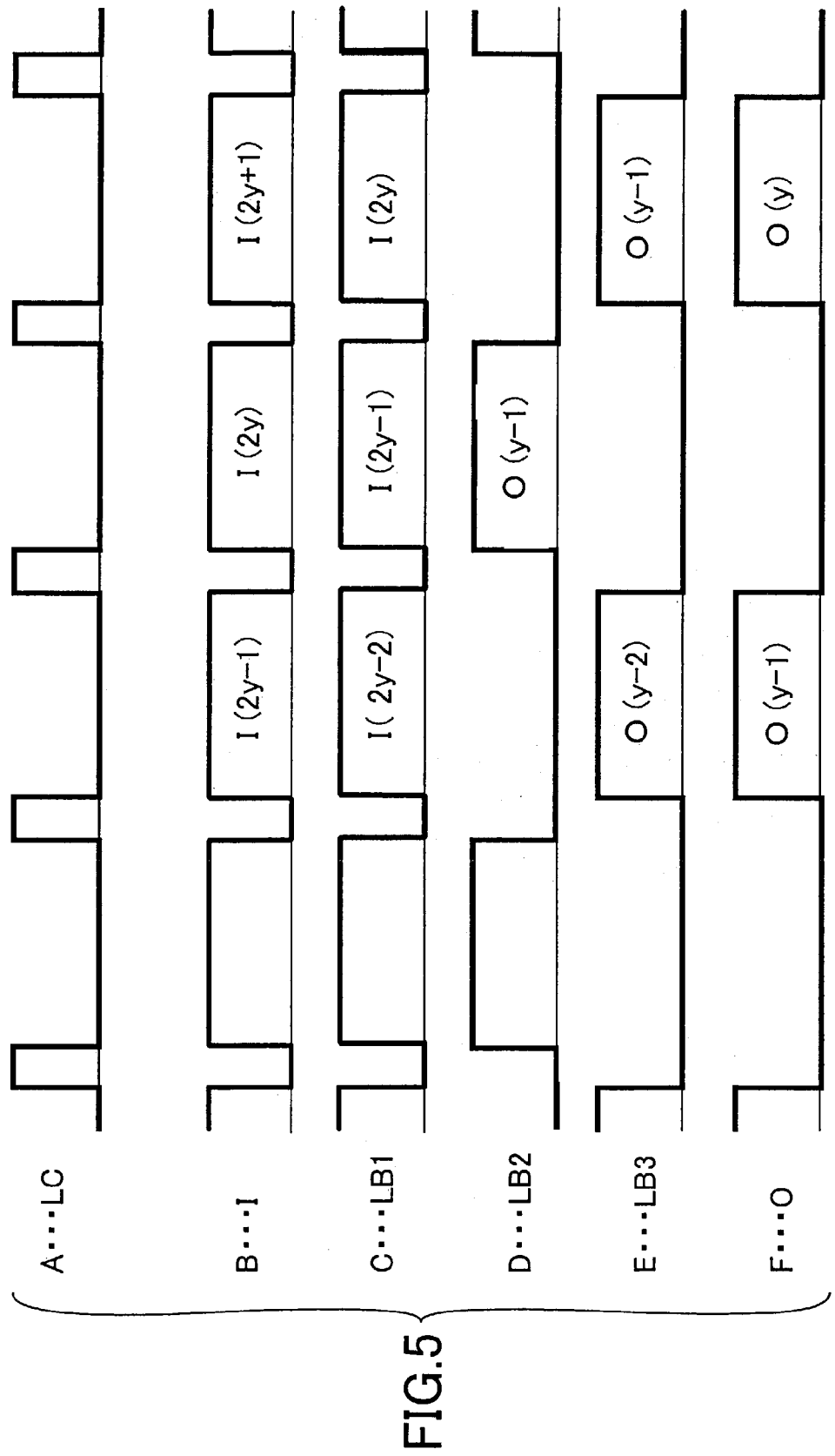
FIG. 5 is a timing diagram showing relationships among a line clock LC, input data I, output data O of an operation part, and output data LB1, LB2, and LB3 of line buffers.

FIG. 5 shows the relationships among a line clock LC, the input data I, the output data LB1 of the line buffer 11, the output data LB2 of the line buffer 12, the output data LB3 of the line buffer 13, and the output data O of the operation part 14. The line clock LC is indicated by FIG. 5-A, the input data I is indicated by FIG. 5-B, the output data LB1 of the ling buffer 11 is indicated by FIG. 5-C, the output data LB2 of the line buffer 12 is indicated by FIG. 5-D, the output data LB3 of the line buffer 13 is indicated by FIG. 5-E, and the output data O of the operation part 14 is indicated by FIG. 5-F. In FIG. 5, an input line is represented by ". . . , 2y–1, 2y, 2y+1, . . . ", an output line is represented by ". . . , y–1, y, y+1, . . . ", input data of each line are represented by ". . . , I(2y–1), I(2y), I(2y+1), . . . ", and the output data are represented by ". . . , O(y–2), O(y–1), O(y), . . . ".

In FIG. 5, line image data O(y) are formed by pixel data o(0, y), o(1, y), o(2, y), . . . o (N–1, y), as is described below.

Figure 6:
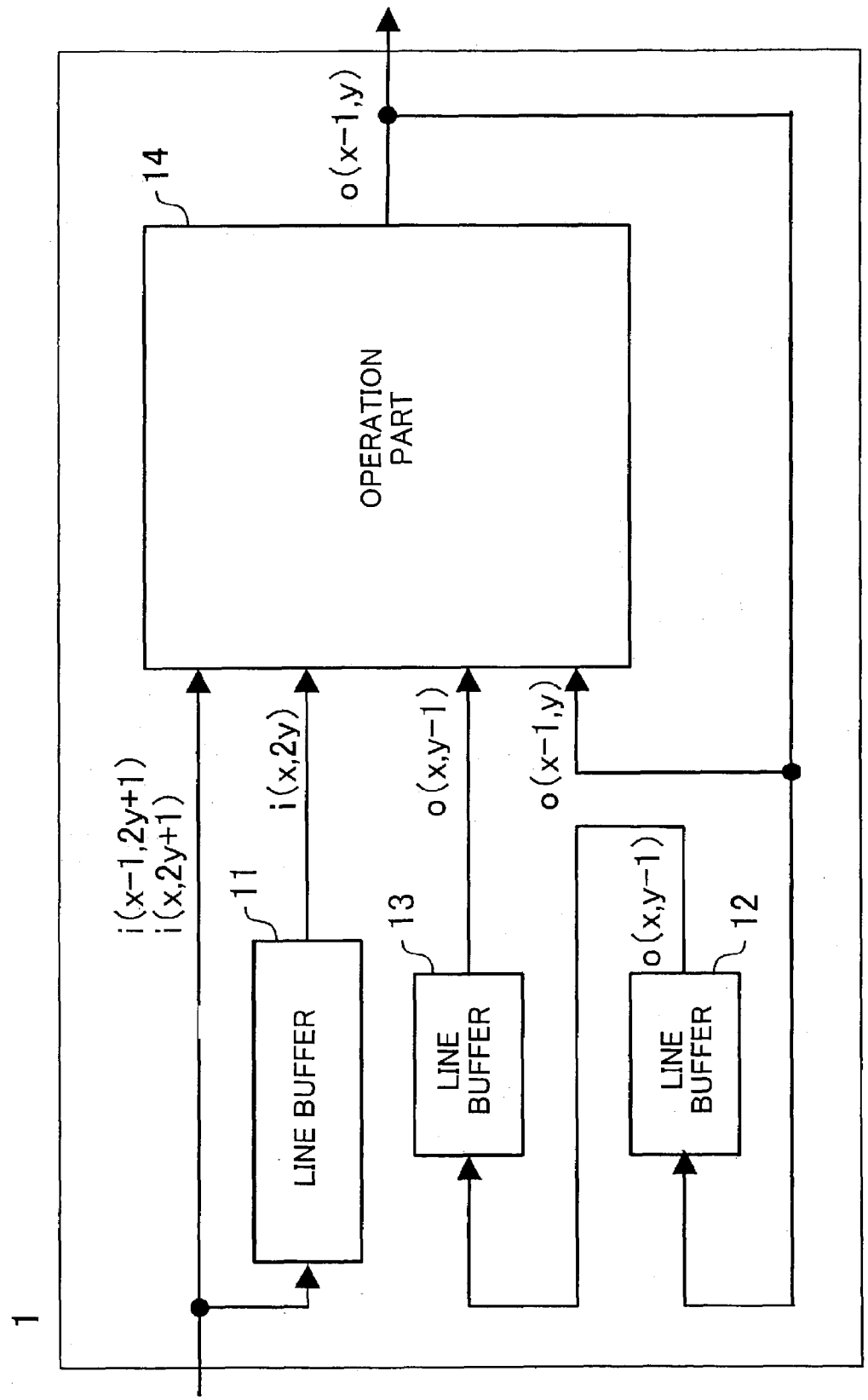
FIG. 6 is a block diagram showing the input data, the output of the operation part, and the output of the line buffers by pixel data.

As shown in FIG. 6, input data i(x–1, 2y+1) and i(x, 2y+1), the output of the line buffer 11: i(x, 2y), the output of the operation part 14: o(x–1, y), the output of the line buffer 13: o(x, y–1) are input to the operation part 14. Thus, the operation part 14 can calculate o (x, y).

Figure 7:
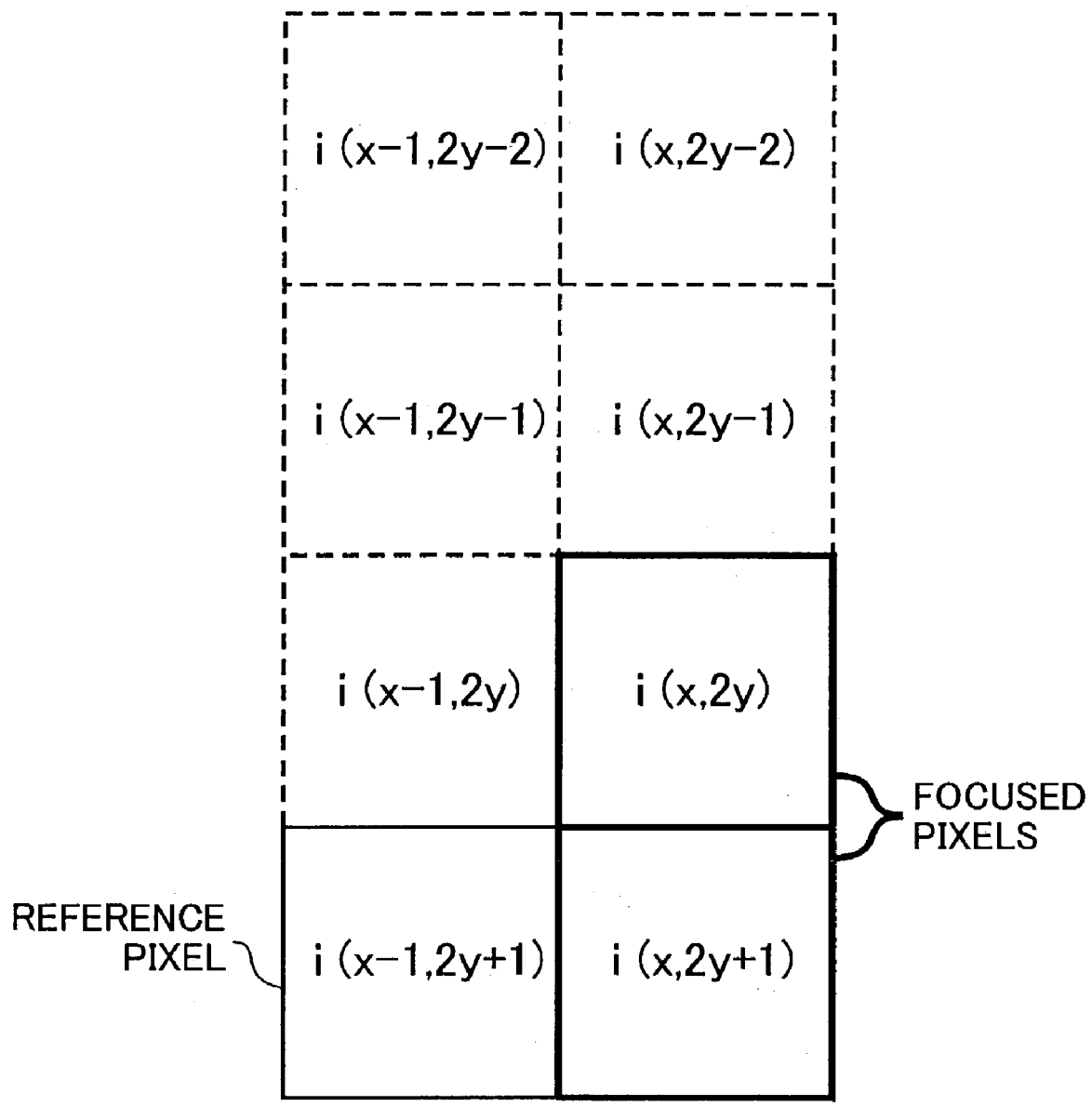
FIG. 7 is a schematic diagram showing focused pixels of an original image and a reference pixel for obtaining reduced image data.
Figure 8:
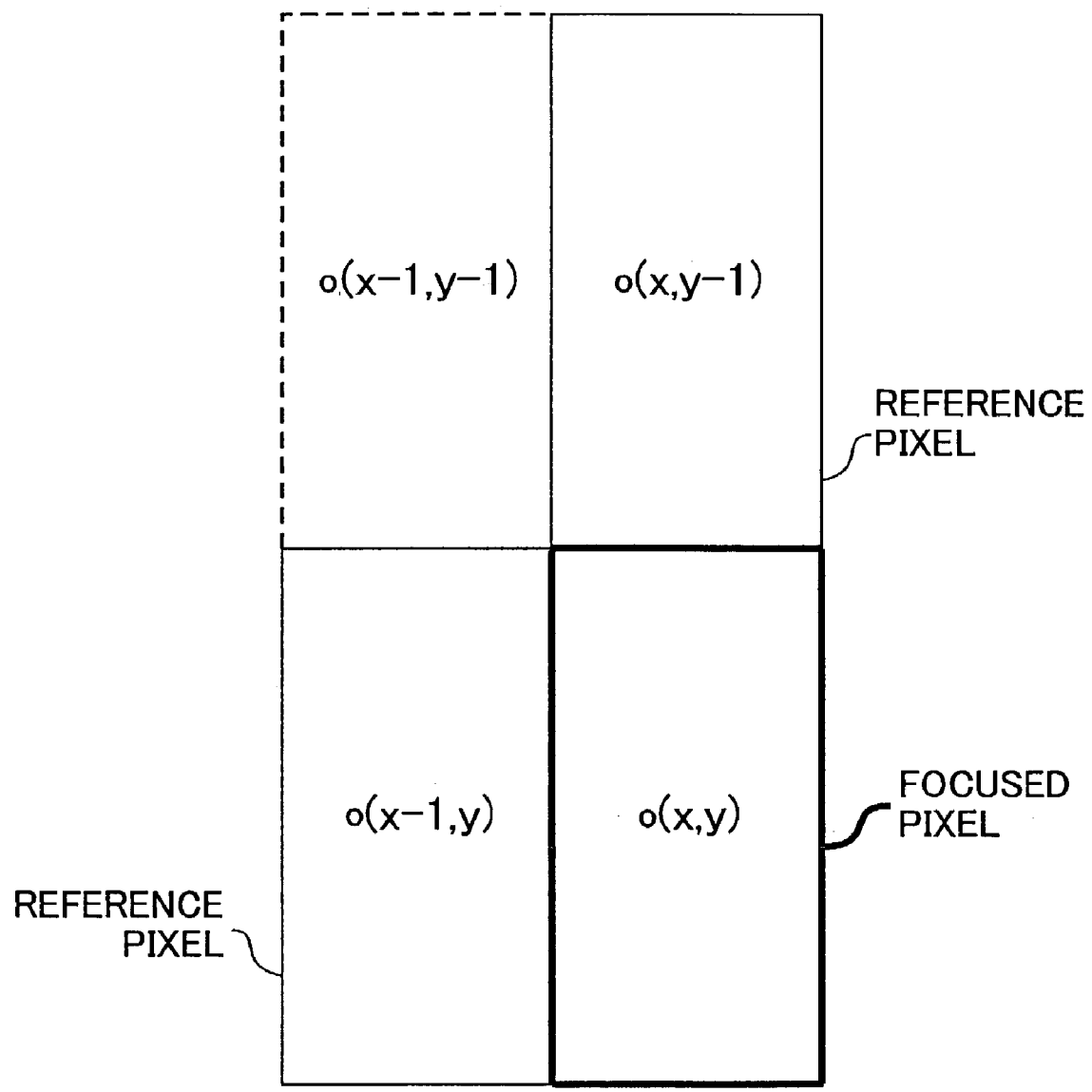
FIG. 8 is a schematic diagram showing a focused pixel and reference pixels of a reduced image for obtaining reduced image data.

In this embodiment, as shown in FIG. 7, in order to obtain reduced image data o(x, y)(the focused pixel of the reduced image), two kinds of focused pixel data i(x, 2y) and i(x, 2y+1), and pixel data i(x–1, 2y+1) that is adjacent in the main scanning direction to i(x, 2y+1) are referred to. At the same time, as shown in FIG. 8, pixel data o(x–1, y) that is adjacent in the main scanning direction to the focused pixel data o(x, y) of the reduced image and pixel data o(x, y–1) that is adjacent in the sub-scanning direction to the focused pixel data o(x, y) are also referred to.

More specifically, the operation part 14 performs calculation of the following Equation 3.

$$o(x, y) = inv[o(x, y-1)] \cdot i(x, 2y) + \\ o(x-1, y) \cdot inv[i(x-1, 2y+1)] \cdot i(x, 2y) + i(x, 2y+1) \quad \text{Equation 3}$$

o: data after reduction
   (black=1, white=0)
i: original image data
   (black=1, white=0)
x: pixel number in main scanning direction
y: pixel number in sub-scanning direction Further, in the above embodiment, the output image data o(x, y) of the operation part 14 are output once in two lines with respect to original image data i that is input in accordance with the line clock (synchronization signal of main scanning) LC, when 50% reduction is performed. Hence, in the above embodiment, the two line buffers 12 and 13 are provided for synchronization of o(x, y–1). However, only one line buffer may be provided, and the content of the line buffer may be updated once in two line clocks in synchronization with the line clock LC.

Additionally, the reduction ratio is not limited to 50%. It is possible to perform free reduction at the reduction ratios from 100% to 50% by combining through output of input line data and the method of this embodiment. Also, it is possible to perform free reduction at a reduction ratio less than 50% by applying the method of this embodiment after carrying out thinning of input lines.

Figure 1A:
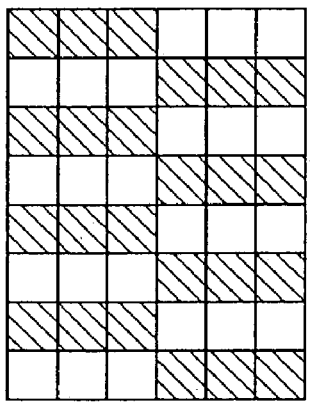
FIG. 1A is a schematic diagram showing a horizontal-striped input image.
Figure 1B:
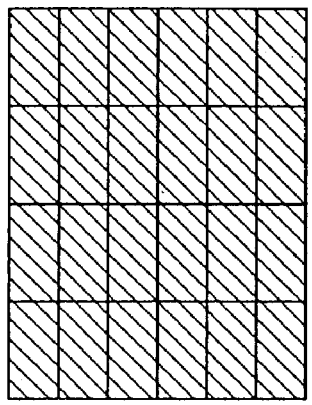
FIG. 1B is a schematic diagram showing the result of a 50% reducing process by an OR operation.
Figure 1C:
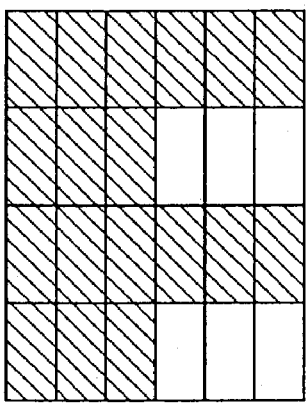
FIG. 1C is a schematic diagram showing the result of a 50% reducing process using a conventional technique A.
Figure 1D:
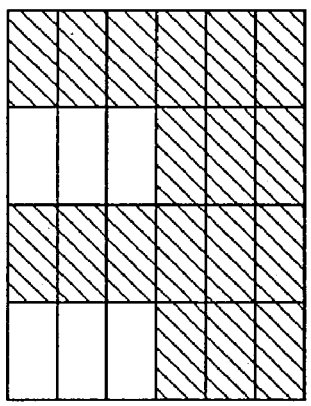
FIG. 1D is a schematic diagram showing the result of a 50% reducing process using a conventional technique B.
Figure 1E:
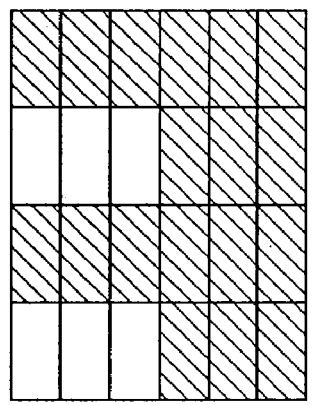
FIG. 1E is a schematic diagram showing the result of a 50% reducing process according to the present invention.
Figure 2A:
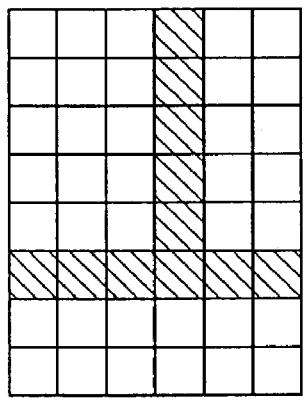
FIG. 2A is a schematic diagram showing an inverted T-shaped input image.
Figure 2B:
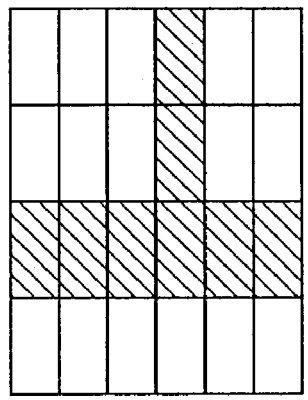
FIG. 2B is a schematic diagram showing the result of the 50% reducing process by an OR operation.
Figure 2C:
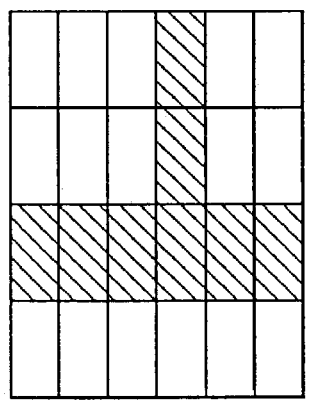
FIG. 2C is a schematic diagram showing the result of the 50% reducing process using the conventional technique A.
Figure 2D:
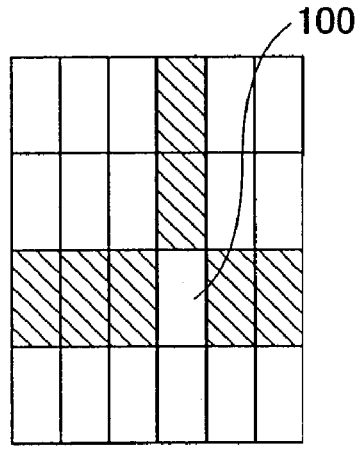
FIG. 2D is a schematic diagram showing the result of the 50% reducing process using the conventional technique B.
Figure 2E:
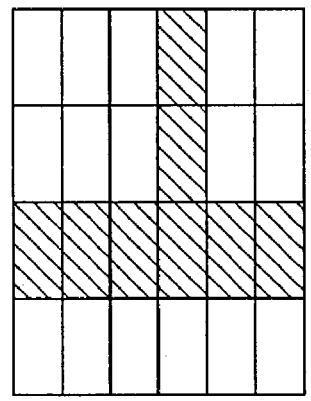
FIG. 2E is a schematic diagram showing the result of the 50% reducing process according to the present invention.
Figure 3A:
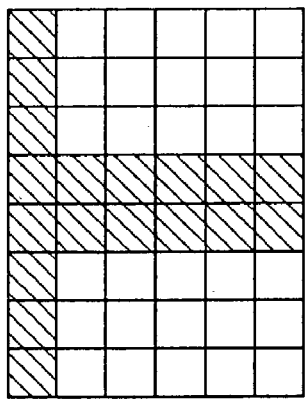
FIG. 3A is a schematic diagram showing a laid T-shaped input image.
Figure 3B:
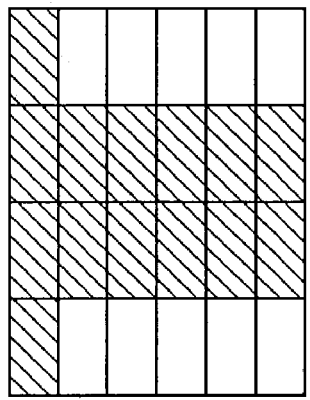
FIG. 3B is a schematic diagram showing the result of the 50% reducing process by an OR operation.
Figure 3C:
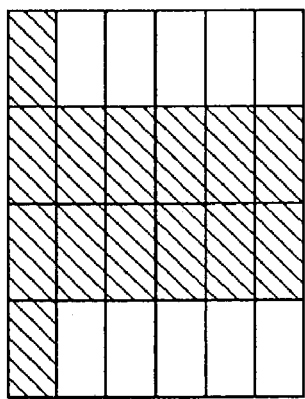
FIG. 3C is a schematic diagram showing the result of the 50% reducing process using the conventional technique A.
Figure 3D:
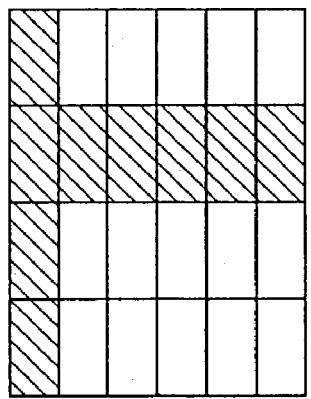
FIG. 3D is a schematic diagram showing the result of the 50% reducing process using the conventional technique B.
Figure 3E:
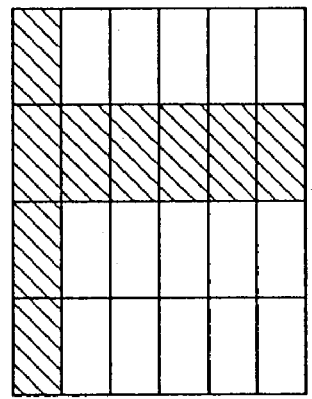
FIG. 3E is a schematic diagram showing the result of the 50% reducing process according to the present invention.

FIG. 1E shows the result of the reducing process performed on the horizontal-striped input image. FIG. 2E shows the result of the reducing process performed on the inverted T-shaped input image. FIG. 3E shows the result of the reducing process performed on the laid T-shaped input image. As shown in FIG. 2E, image quality is not degraded with respect to the inverted T-shaped input image. Also, as shown in FIG. 3E, line thickening does not occur in the laid T-shaped input image.

That is, if reduced image data o(x, y–1) of the previous line is white (=0), the term "inv [o(x, y–1)]·i(x, 2y)" of Equation 3 is a simple OR operation. Accordingly, loss of thin lines does not occur and, as shown in FIG. 1E, it is possible to avoid generation of a solid black image.

Additionally, in the term "o (x–1, y)·inv [i(x–1, 2y+1)]·i (x, 2y)" of Equation 3, by referring to the peripheral pixel data o(x–1, y) that is adjacent in the main scanning direction to processed reduced image data, as shown in FIG. 2E, it is possible to prevent image quality degradation in an inverted T-shaped image.

Further, in the term "o (x–1, y)·inv [i(x–1, 2y+1)]·i(x, 2y)" of Equation 3, by referring to the peripheral pixel data i(x–1, 2y+1) that is adjacent in the main scanning direction to the original image data, as shown in FIG. 3E, it is possible to prevent line thickening in laid T-shaped images.

Figure 9:
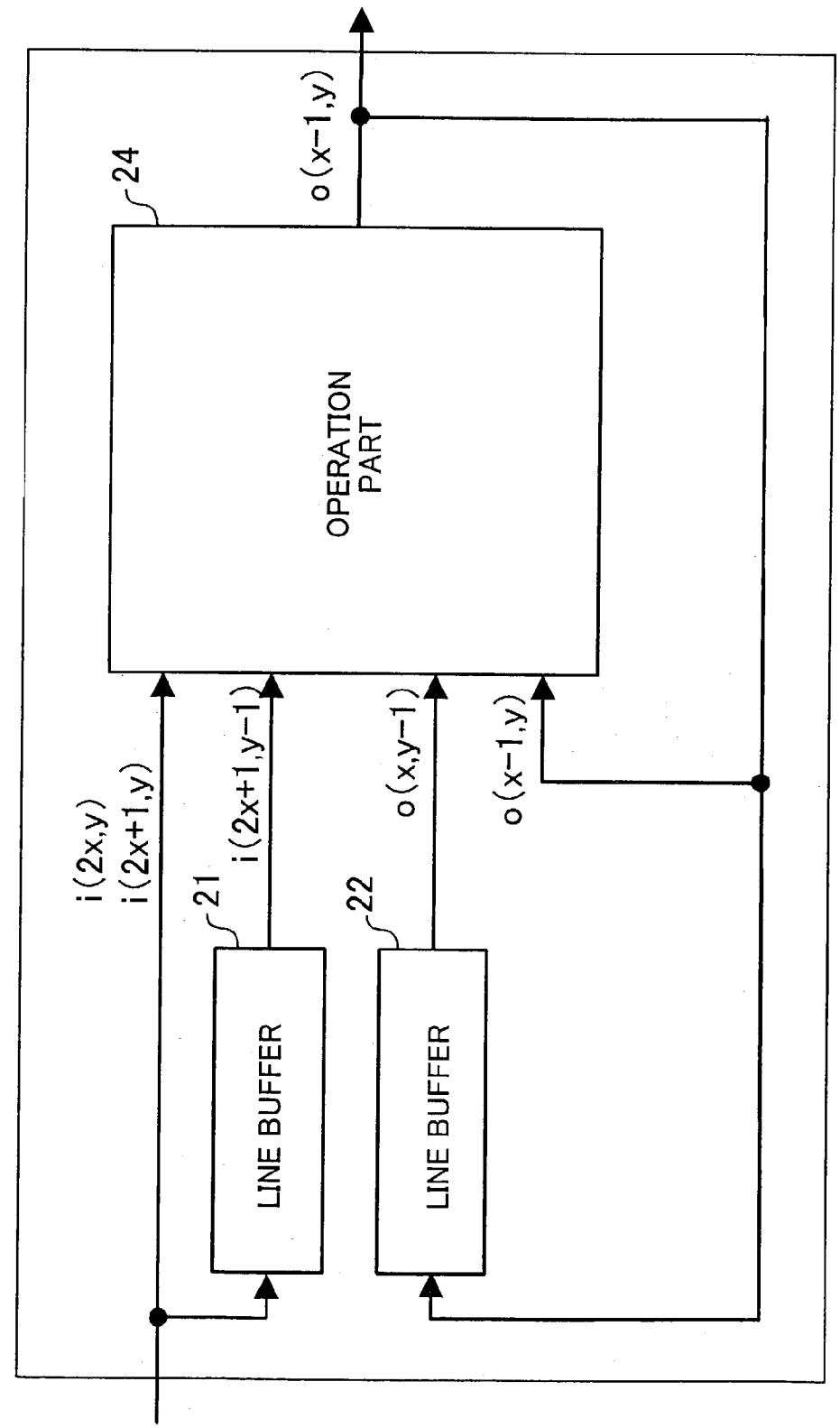
FIG. 9 is a block diagram showing the circuit configuration according to the present invention in a case where reduction in the main scanning direction is performed.

The circuit configuration shown in FIG. 4 may be used even when performing reduction in the main scanning direction. Specifically, the image processing circuit shown in FIG. 9 is used. As shown in FIG. 9, input data i(2x, y) and i(2x+1, y), the output data i(2x+1, y–1) of a line buffer 21, the output data o(x–1, y) of an operation part 24, and the output data o(x, y–1) of a line buffer 22 are input to the operation part 24. Thus, the operation part 24 can calculate o(x, y). In this case, the same line clock is used for both input and output, and an input pixel clock becomes twice an output pixel clock.

The following equation expresses o(x, y) on this occasion.

$$o(x, y) = inv[o(x-1, y)] \cdot i(2x, y) + \\ o(x, y-1) \cdot inv[i(2x+1, y-1)] \cdot i(2x, y) + i(2x+1, y) \quad \text{Equation 4}$$

o: data after reduction
   (black=1, white=0)
i: original image data
   (black=1, white=0)
x: pixel number in main scanning direction
y: pixel number in sub-scanning direction According to the present invention, when reducing an image, it is possible to prevent loss of thin lines and generation of solid black images and to prevent image quality degradation in inverted T-shaped images and line thickening in laid T-shaped images, which problems cannot be solved by conventional operations.

The present invention is not limited to the specifically disclosed embodiments, and variations and modifications may be made without departing from the scope of the present invention.

The present application is based on Japanese priority application No. 2002-186061 filed on Jun. 26, 2002, the entire contents of which are hereby incorporated by reference.

What is claimed is:

1. An image processing circuit reducing binary data of an original image in a reduction direction that is one of a main scan direction and a sub-scan direction, comprising:
   at least one line buffer storing data of each line of the original image;
   at least one line buffer storing data of each line of a reduced image; and
   an operation part obtaining data of a given pixel of the reduced image by performing a logical operation based on data of two focused pixels of the original image, data of a pixel of the original image situated adjacent to one of the focused pixels in one of the main scan direction and the sub-scan direction that is not the reduction direction, data of a pixel of the reduced image situated adjacent to the given pixel in the main scan direction and data of a pixel of the reduced image situated adjacent to the given pixel in the sub-scan direction, the given pixel of the reduced image corresponding to the two focused pixels.

2. The image processing circuit as claimed in claim 1, wherein, when performing a reducing operation in the main scanning direction, the operation part performs the logical operation by using the data of the pixel that is adjacent in the sub-scanning direction to the focused pixels of the original image.

3. The image processing circuit as claimed in claim 1, wherein, when performing a reducing operation in the sub-scanning direction, the operation part performs the logical operation by using the data of the pixel that is adjacent in the main scanning direction to the focused pixels of the original image.

4. The image processing circuit as claimed in claim 1, wherein, when performing a reducing operation in the main scanning direction, the operation part performs the logical operation by using the data of the pixel that is adjacent in the sub-scanning direction to the pixel of the reduced image, the pixel of the reduced image corresponding to the focused pixels.

5. The image processing circuit as claimed in claim 1, wherein, when performing a reducing operation in the sub-scanning direction, the operation part performs the logical operation by using the data of the pixel that is adjacent in the main scanning direction to the pixel of the reduced image, the pixel of the reduced image corresponding to the focused pixels.

6. An image processing circuit reducing binary data of an original image, comprising:
   at least one line buffer storing data of each line of the original image;
   at least one line buffer storing data of each line of a reduced image; and
   an operation part performing a logical operation based on data of focused pixels of the original image, data of a peripheral pixel of the focused pixels, and data of peripheral pixels of a pixel of the reduced image, the pixel of the reduced image corresponding to the focused pixels,
   wherein the operation part performs a logical operation expressed by:

$$o(x, y) = inv[o(x, y-1)] \cdot i(x, 2y) + \\ o(x-1, y) \cdot inv[i(x-1, 2y+1)] \cdot i(x, 2y) + i(x, 2y+1)$$

where "i" is pixel data of the original image (black=1, white=0), "o" is pixel data of the reduced image (black=1, white=0), "x" is a pixel value in a main scanning direction, and "y" is a pixel value in a sub-scanning direction.

7. An image processing circuit reducing binary data of an original image, comprising:
   at least one line buffer storing data of each line of the original image;
   at least one line buffer storing data of each line of a reduced image; and
   an operation part performing a logical operation based on data of focused pixels of the original image, data of a peripheral pixel of the focused pixels, and data of peripheral pixels of a pixel of the reduced image, the pixel of the reduced image corresponding to the focused pixels,
   wherein the operation part performs a logical operation expressed by:

$$o(x, y) = inv[o(x-1, y)] \cdot i(2x, y) + \\ o(x, y-1) \cdot inv[i(2x+1, y-1)] \cdot i(2x, y) + i(2x+1, y)$$

where "i" is pixel data of the original image (black=1, white=0), "o" is pixel data of the reduced image (black=1, white=0), "x" is a pixel value in a main scanning direction, and "y" is a pixel value in a sub-scanning direction.

8. An image processing circuit reducing binary data of an original image in a reduction direction that is one of a main scan direction and a sub-scan direction, comprising:
   first line buffer means for storing data of each line of the original image;

second line buffer means for storing data of each line of a reduced image; and an operation means for obtaining data of a given pixel of the reduced image by performing a logical operation based on data of two focused pixels of the original image, data of a pixel of the original image situated adjacent to one of the focused pixels in one of the main scan direction and the sub-scan direction that is not the reduction direction, data of a pixel of the reduced image situated adjacent to the given pixel in the main scan direction, and data of a pixel of the reduced image situated adjacent to the given pixel in the sub-scan direction, the given pixel of the reduced image corresponding to the two focused pixels.

9. The image processing circuit as claimed in claim 8, wherein, when performing a reducing operation in the main scanning direction, the operation means performs the logical operation by using the data of the pixel that is adjacent in the sub-scanning direction to the focused pixels of the original image.

10. The image processing circuit as claimed in claim 8, wherein, when performing a reducing operation in sub-scanning direction, the operation means performs the logical operation by using the data of the pixel that is adjacent in the main scanning direction to the focused pixels of the original image.

11. The image processing circuit as claimed in claim 8, wherein, when performing a reducing operation in the main scanning direction, the operation means performs the logical operation by using the data of the pixel that is adjacent in the sub-scanning direction to a pixel of the reduced image, the pixel of the reduced image corresponding to the focused pixels.

12. The image processing circuit as claimed in claim 8, wherein, when performing a reducing operation in the sub-scanning direction, the operation means performs the logical operation by using the data of the pixel that is adjacent in the main scanning direction to a pixel of the reduced image, the pixel of the reduced image corresponding to the focused pixels.

13. An image processing circuit reducing binary data of an original image comprising:

first line buffer means for storing data of each line of the original image;

second line buffer means for storing data of each line of a reduced image; and an operation means for performing a logical operation based on data of focused pixels of the original image, data of a peripheral pixel of the focused pixels, and data of peripheral pixels of a pixel of the reduced image, the pixel of the reduced image corresponding to the focused pixels, wherein the operation means performs a logical operation expressed by:

$$o(x, y) = inv[o(x, y-1)] \cdot i(x, 2y) + o(x-1, y) \cdot inv[i(x-1, 2y+1)] \cdot i(x, 2y) + i(x, 2y+1)$$

where "i" is pixel data of the original image (black=1, white=0), "o" is pixel data of the reduced image (black=1, white=0), "x" is a pixel value in a main scanning direction, and "y" is a pixel value in a sub-scanning direction.

14. An image processing circuit reducing binary data of an original image comprising:

first line buffer means for storing data of each line of the original image;

second line buffer means for storing data of each line of a reduced image; and an operation means for performing a logical operation based on data of focused pixels of the original image, data of a peripheral pixel of the focused pixels, and data of peripheral pixels of a pixel of the reduced image, the pixel of the reduced image, corresponding to the focused pixels, wherein the operation means performs a logical operation expressed by:

$$o(x, y) = inv[o(x-1, y)] \cdot i(2x, y) + o(x, y-1) \cdot inv[i(2x+1, y-1)] \cdot i(2x, y) + i(2x+1, y)$$

where "i" is pixel data of the original image (black=1, white=0), "o" is pixel data of the reduced image (black=1, white=0), "x" is a pixel value in a main scanning direction, and "y" is a pixel value in a sub-scanning direction.

15. An image processing method of reducing binary data of an original image, comprising the steps of:

storing data of each line of the original image;

storing data of each line of a reduced image; and obtaining data of a given pixel of the reduced image by performing a logical operation based on data of two focused pixels of the original image, data of a pixel of the original image situated adjacent to one of the focused pixels in one of the main scan direction and the sub-scan direction that is not the reduction direction, data of a pixel of the reduced image situated adjacent to the given pixel in the main scan direction and data of a pixel of the reduced image situated adjacent to the given pixel in the sub-scan direction, the given pixel of the reduced image corresponding to the two focused pixels.

* * * * *